United States Patent [19]

Mann et al.

[11] Patent Number: 5,754,029
[45] Date of Patent: May 19, 1998

[54] BATTERY CHARGER WITH CALENDAR CONTROL

[75] Inventors: Timothy Curtis Mann, Morristown; John Herbert Stevens, Martinsville, both of Ind.

[73] Assignee: Thomson Consumer Electronics, Inc., Indianapolis, Ind.

[21] Appl. No.: 951,251

[22] Filed: Oct. 16, 1997

Related U.S. Application Data

[63] Continuation of Ser. No. 326,882, Oct. 21, 1994, abandoned.

[30] Foreign Application Priority Data

Nov. 23, 1993 [GB] United Kingdom ............... 9324051

[51] Int. Cl.$^6$ .................................................. H01M 10/46
[52] U.S. Cl. ........................................ 320/106; 320/112
[58] Field of Search ............................... 320/106, 110, 320/112, 126, 132, DIG. 12, DIG. 19, DIG. 21, 101, 104, 147; 429/61, 90; 364/569, 705.01, 705.08

[56] References Cited

U.S. PATENT DOCUMENTS

| | | | |
|---|---|---|---|
| 4,567,557 | 1/1986 | Burns | 364/145 |
| 4,715,010 | 12/1987 | Inoue et al. | |
| 4,774,697 | 9/1988 | Aihara . | |
| 4,833,618 | 5/1989 | Verma et al. | 364/483 |
| 4,849,682 | 7/1989 | Bauer et al. | 320/15 |
| 4,852,030 | 7/1989 | Munday | 364/569 |
| 4,868,800 | 9/1989 | Arber . | |
| 5,013,972 | 5/1991 | Malkieli et al. | 315/209 |
| 5,057,383 | 10/1991 | Sokira | 429/92 |
| 5,111,128 | 5/1992 | Branan, Jr. et al. | 320/2 |
| 5,199,009 | 3/1993 | Svast . | |
| 5,200,686 | 4/1993 | Lee | 320/2 |
| 5,206,097 | 4/1993 | Burns et al. | 320/48 X |
| 5,214,622 | 5/1993 | Nemoto et al. . | |
| 5,220,540 | 6/1993 | Nishida et al. . | |
| 5,285,963 | 2/1994 | Wakefield et al. | 237/2 A |
| 5,287,109 | 2/1994 | Hesse . | |
| 5,399,446 | 3/1995 | Takahashi | 429/90 |
| 5,621,458 | 4/1997 | Mann et al. . | |

FOREIGN PATENT DOCUMENTS 304078  10/1992  Japan .

OTHER PUBLICATIONS

The Random House College Dictionary, 1975 Revised edition, frontispieces and p. 677.

*Primary Examiner*—Edward Tso
*Attorney, Agent, or Firm*—Joseph S. Tripoli; Joseph J. Laks; Francis A. Davenport

[57] ABSTRACT

A battery charging apparatus anticipates usage and thus provides a charged battery available for use. In addition the charging regimen employed substantially eliminates memory effects in NICAD batteries. The battery charging apparatus comprises a power supply for generating a controllable battery charging current which is responsive to battery status. A plurality of calendars, stored in PROM, are user selectable to form a custom calendar. User specific event dates may be added to produce a composite calendar. A microprocessor maintains a real time clock calendar and executes a calendar algorithm. Upon the occurrence of a composite calendar event date, the microprocessor generates a control signal for initiating the battery charging current. The microprocessor also produces a status message display. Message data is stored in PROM and is used to generate a video signal for monitor display. The video signal is also coupled to an RF modulator for TV receiver display. Upon cessation of charging, due to completion or malfunction, battery identification and charging data are stored in memory to form a battery history.

24 Claims, 4 Drawing Sheets

BATTERY CHARGER WITH CALENDAR CONTROL

This is a continuation of application Ser. No. 08/326,882 filed on Oct. 21, 1994 now abandoned.

This invention relates to the field of battery charging, and in particular to microprocessor controlled charging.

BACKGROUND OF THE INVENTION

When nickel cadmium (NICAD) battery powered devices are repetitively operated with incomplete battery discharge/recharge cycles, a reduction in dischargable battery capacity may result. This loss of capacity is known as memory, a condition wherein the dischargable capacity is progressively reduced. In practical terms, for example, a user of a NICAD powered camcorder may experience reduced operating time or low-voltage cutoff. The problem of incomplete discharge is exacerbated if the battery is stored attached to a device which has significant current drain. When a camcorder is turned off, for example, the microprocessor in the camcorder is sustained by current drawn from the battery which may be considerably greater than the inherent self discharge effects in most batteries. Lead acid batteries are not subject to the memory effects of nickel cadmium cells. However, lead acid batteries suffer a reduction in capacity if allowed to remain in a discharged state. This reduction in capacity may result from the formation of sulfate on the lead plate surfaces reducing the plate area and thus the charge and discharge capacity.

The reduction in dischargable capacity in nickel cadmium batteries, or memory effect, can be substantially eliminated by an effective discharge followed by full charging. Many battery chargers incorporate some form of user initiated discharge/recharge cycle. FIG. 1 shows a typical microprocessor controlled battery charging. AC power is converted to DC in power block 10 which provides high current capability for battery charging, and a regulated supply for the control circuitry. The charging current is coupled to the battery via a charger output 40. The charger output 40 comprises control elements, for example a series pass transistor for charging, and a shunt connected controlled load to provide a "refreshing" discharge. An integrated circuit (I.C.) controller 30, typically having a PWM output, is coupled to the pass transistor to provide control of the battery charging current. The charger is controlled by a microprocessor 20 which monitors the AC supply, battery connection and battery status, for example, battery potential, charging current, cell temperature etc. Although this typical charger provides both charging and battery refreshing, these functions must be initiated manually. Hence the typical charger of FIG. 1 provides an incomplete solution to the problem of battery memory since the user may inevitably fail to utilize the "refresh" cycle until diminished battery capacity becomes apparent. Furthermore, users of rechargeable battery powered equipment are unlikely to adhere to a regimen of preventative battery conditioning to maintain the battery in peak condition.

There are other secondary cells which endure discharged storage, do not suffer from memory effects, and are capable of rapid recharge. However, even with batteries such as these, the user's expectation of immediate, instant use is frustrated if the battery is not charged and ready for service.

SUMMARY OF THE INVENTION

An inventive battery charger and camcorder coupling system is disclosed where a camcorder is mated with appropriate connectors of a coupling or docking unit. The connectors provide DC to power the camcorder and provide audio and video output connection for coupling to external monitoring devices. The docking unit is AC powered, comprises various sub-systems, and also provides for charging and conditioning of more than one battery by means of an inventive method. The unit also provides connection capability to a display device at baseband, via video and audio inputs, or at RF, via a modulated RF output. The RF modulator is coupled to an active antenna loop-through which permits a permanent T.V. antenna connection and facilitates camcorder viewing without changing antenna cabling at the TV receiver. The inventive battery charging system may be controlled by manually operated front panel switches or via a remote control unit. The status of the docking unit is displayed on a display panel with control functions selected from a menu based display with prompting. The status is also provided as a base band video signal for monitor display and as a modulated RF signal for TV receiver usage. A hand held IR controller may control the docking unit and camcorder via a direct docking connection, or control may be provided to each component via an IR transmitter which forms part of the docking unit. The battery charging apparatus comprises a power supply for generating a controllable battery charging current; and a microprocessor for executing a calendar algorithm having at least one predetermined event date and upon an occurrence of the event date, generating a control signal for controlling the battery charging current.

DETAILED DESCRIPTION

Figure 1:
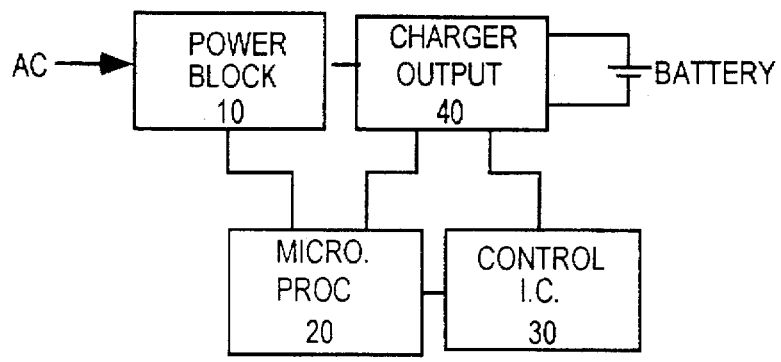
FIG. 1 shows a microprocessor controlled battery charging system according to the prior art.
Figure 2:
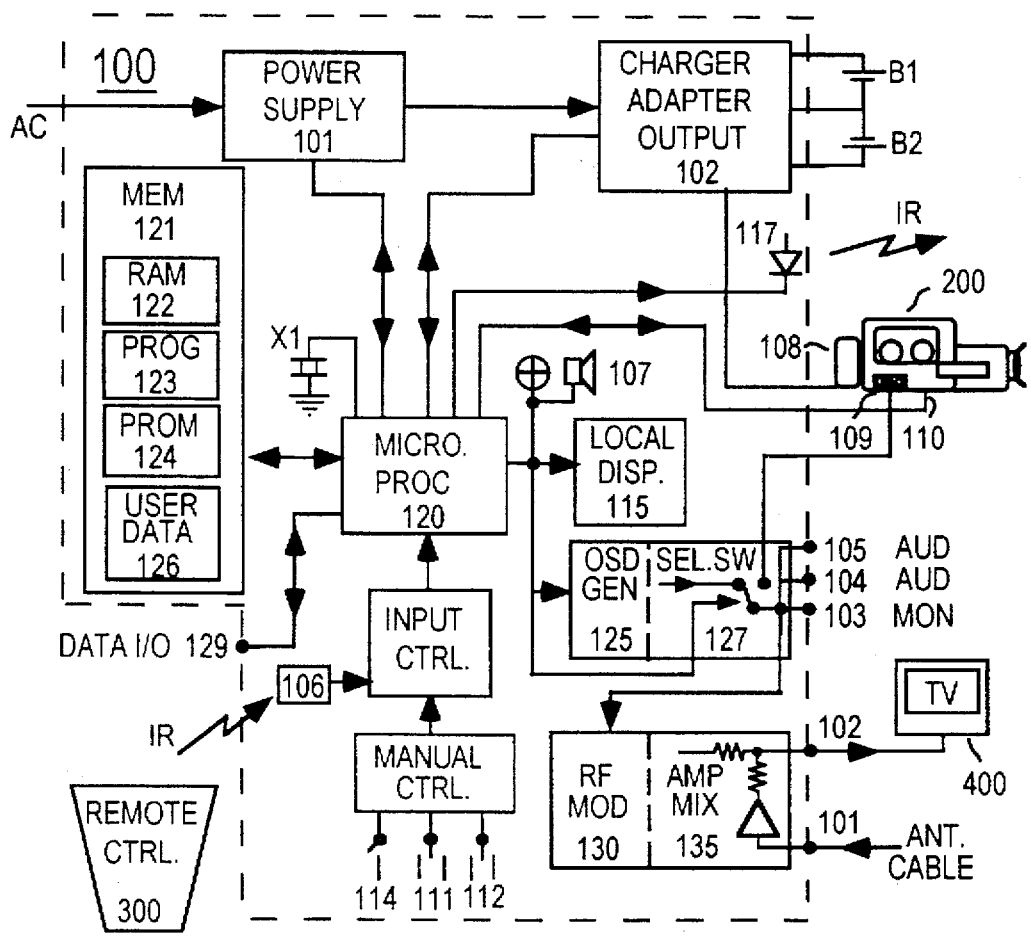
FIG. 2 is a block diagram of an adaptive battery charging system according to an inventive arrangement.

An inventive battery conditioning charger 100 shown in FIG. 2 comprises a power supply 101, which converts AC power into various DC supplies for battery charging, camcorder power, and internal circuit power. The DC charging current and camcorder adapter power is coupled to a charger adapter output 102. The charger adapter output contains current control elements such as series pass transistors for supplying a charging current, and controlled loads for dissipating a discharging current for NICAD battery cell conditioning, refreshing or rejuvenating. The charger may charge batteries of various cell chemistries and may automatically determine the cell type by sensing battery case identifiers. One or more batteries of the same type may be demounted from the camcorder and plugged into connectors B1 or B2 for charging. The adapter output DC is also available via connector 108 which connects to the camcorder in place of the battery. A suitably equipped camcorder may be powered by the adapter via interface connector 110. Interface connector 110 may provide charging current for a camcorder with battery attached. In addition to DC powering, connector 110 provides a data I/O connection which allows camcorder control commands to be input and battery use data to be retrieved from a mounted camcorder or battery for use by microprocessor 120. Connector 110 also provides audio and video coupling.

A microprocessor 120 is utilized for control and monitoring of the battery and charging process. Microprocessor 120 is coupled to the power supply, the charger output, the camcorder, a memory 121, a local display 115 and an on-screen-display generator 125. An illuminated indicator and acoustic sounder 107 are driven by an output from the microprocessor. The microprocessor receives user control commands via manual controls 111, 112, 114, or from a remote control unit, for example IR remote 300, via receiver 106. A data input output connector 129 is provided which allows the user to couple, for example, a personal computer, "lap top" or note book computer to access data, for example the consolidated calendar or battery life data, or to input additional user specific event dates.

Battery charging may be initiated manually, however, automated charge initiation is provided based on events stored and accessed by an adaptive calendar algorithm resident in memory 121. The microprocessor 120 maintains a real time clock calendar function which is referenced to a quartz crystal oscillator X1. However, it is known that a real time clock may be synchronized by reception of a suitable broadcast time reference, for example, as transmitted by the Public Broadcasting System.

Memory 121, comprises a factory programmed PROM 124 which contains a plurality of calendars. The user may make selections from the plurality of calendars and an advantageous algorithm constructs a custom calendar from the choices. For example, the user may select a calendar appropriate to the country of residence. This calendar may, for example, be combined with the calendar of a foreign country. This combination of calendars may be further combined with a specific holiday or religious schedule or the like, to produce a custom calendar. Events listed to occur in the custom calendar may be tagged, or annotated to produce specific or unique actions. For example, if an overseas calendar has been included in the custom calendar, automated initiation of, for example, battery charging may not be required and may be inhibited on overseas event dates. However, manual operation may be selected at any time and will over ride any calendar generated occurrences during that day.

Figure 5:
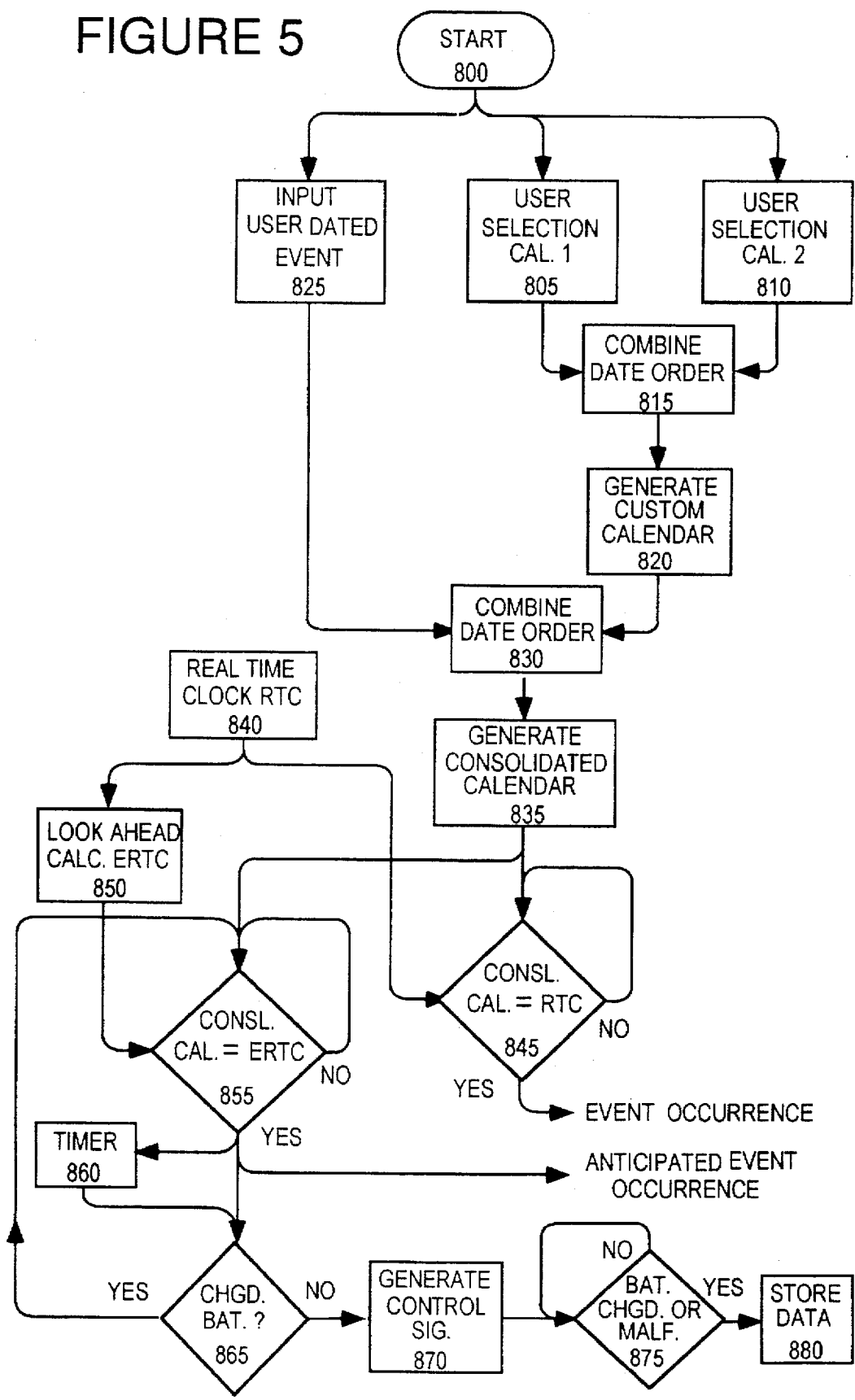
FIG. 5 is a flow chart of an inventive method.

The inventive control method, illustrated as a flow chart in FIG. 5, is resident in the program storage PROG 123 of memory 121. The control method is executed in conjunction with the real time clock calendar, and generates charge initiation dates appropriate to the user's custom calendar, for example, New Year's eve, 4th July, 5th November, Christmas, etc. Thus, the battery is charged and the camcorder is ready for immediate use based on custom calendar derived events.

In addition to the factory programmed calendars, memory space USER DATA 126 is provided for storage of user entered calendar events such as birthdays, anniversaries and special events. The advantageous method merges the user events with the custom calendar to form a consolidated or composite calendar. In addition to the execution of events derived from the composite calendar, the inventive method adaptively modifies the occurrence of automatic charge initiation based on actual battery usage data monitored by the microprocessor. The advantageous method is described with reference to flow chart of FIG. 5.

The operational status of the charger, batteries and camcorder is indicated by display 115. Display 115 is driven by the microprocessor and may also display the internal real time clock calendar or a listing of upcoming event dates. Upon the occurrence of an event, originated by either the consolidated calendar or charger status, a message is generated for display by display 115. Indicator 107 functions as a message waiting indicator and may be accompanied by a defeatable alerting audible beep. Indicator 107 may indicate an event occurrence message in a first color and a warning message in a second color, for example, red.

An event occurrence which resulted in the generation of an information message on display 115, may also cause a message, which is stored in PROM 124, to be read and coupled for video formatting by an on screen display (OSD) generator 125. The PROM may contain multiple information messages, and warnings. The OSD generates a signal at connector 103 capable of display on a video monitor, and also provides an input to RF modulator 130. The RF modulator 130 generates a signal capable of TV reception and has output is coupled to an antenna amplifier and mixer 135. Thus the charger status, etc., may be viewed on a television receiver 400.

Figure 3A:
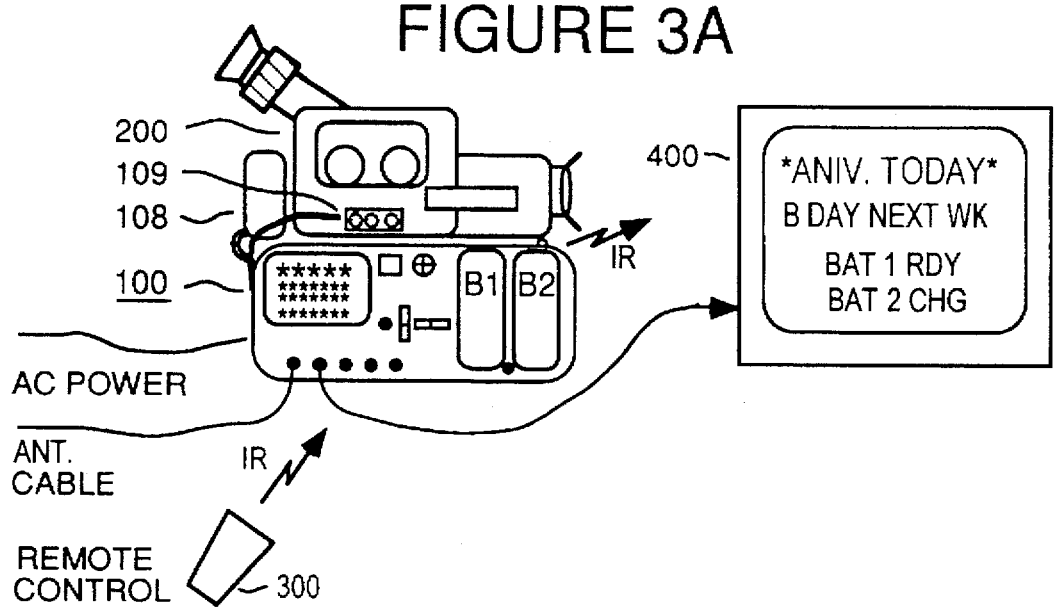
FIG. 3A shows a battery charging and camcorder coupling system according to an inventive arrangement.

FIG. 3A illustrates an inventive battery charger and camcorder coupling system. A camcorder 200 is shown mated with appropriate connectors of a coupling or docking unit 100. The connectors provide DC to power the camcorder, audio and video output connections 103, 104 and 105 respectively for coupling to audio and video monitoring devices. The docking unit is AC powered and comprises the various sub-systems described with reference to FIG. 2. The docking unit 100 also provides for charging and conditioning a plurality of batteries, for example, two batteries by means of an inventive method. The unit also provides connection capability to a display device at baseband, via video and audio inputs, or at RF, via a modulated RF output. The RF modulator 130 is coupled to an antenna amplifier 135 which provides an antenna loop-through thus permitting a permanent T.V. antenna connection which facilitates camcorder viewing without changing antenna cabling at TV receiver 400. The inventive system shown in FIG. 3A may be controlled by manually operated front panel switches 111, 112 and 114 or via a remote control unit 300, for example a hand held IR controller. The status of the docking unit is displayed on a display panel 115 with control functions selected from a menu based display with prompting. The status is also provided as a baseband video signal for monitor display and as a modulated RF signal for display on a TV receiver. The hand held IR controller 300 may control the docking unit and camcorder via a direct docking connection, or control may be provided to each component via an IR transmitter 117 which forms part of the docking unit.

Figure 3B:
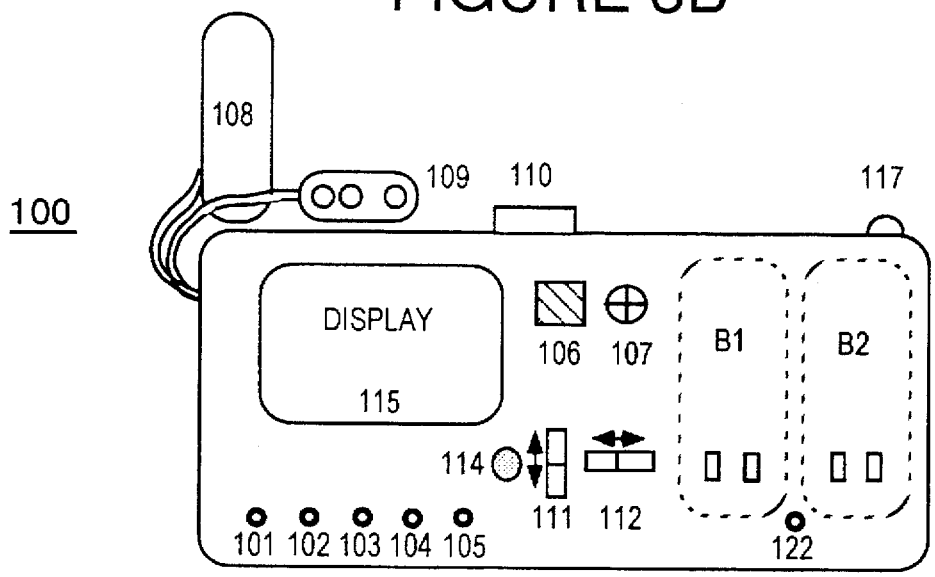
FIG. 3B shows the inventive battery charging and camcorder coupling apparatus depicted in FIG. 2.

FIG. 3B illustrates an exemplary control panel for the adaptive battery charger and camcorder coupling system 100. The unit may be controlled by manually operated switches which permit control of mode selection by scrolling through various menus displayed by display 115. For example, switches 111 and 112, may be rocker switches having a spring biased center off condition. Pressing in the appropriate arrow direction causes a display cursor to move, or the display to scroll in the selected direction. The desired function may be selected by activate button 114. Similarly the displayed menu of control options may be accessed, scrolled through and selected by IR remote control unit 300 coupled via IR receiver 106. The information shown on display 115 is also available for viewing on the video monitor or TV receiver 400. Connector 109 provides audio and video connection of camcorder signals for coupling to the monitor video output 103 and audio outputs 104 and 105. The signals are also coupled to RF modulator 130 for TV receiver viewing. The display messages may be inhibited, however, battery and charger warnings are not defeatable.

The consolidated calendar, comprising the user's custom calendar merged with user specific dates, is monitored by the algorithm. The algorithm generates a charge initiate command based on the occurrence of a consolidated calendar event. However, in the event of battery failure detected during charging, it is beneficial to provide the user with time to take remedial action. Hence charging is advantageously initiated several days prior to the event date by means of a look ahead feature in the control method or algorithm.

Various methods are known for determining battery charge or battery capacity together with various charging current control methods. Furthermore data may be read from the battery to determine the cell chemistry and method of charging required by the battery type. However, data resulting from such battery evaluation methods may be accessed by the algorithm for processing by the microprocessor to adaptively determine the charging requirements based on the actual battery condition. For example, the battery may be fully charged and require only trickle or top up charging, whereas a fully discharged condition may require fast charging, and a partially discharged battery may benefit from a refresh or rejuvenate and recharge cycle. During periods with no calendar events, and no significant battery usage, the battery may be topped up every fourth week, for example, or may be subject to refresh or rejuvenation cycles.

Figure 4A:
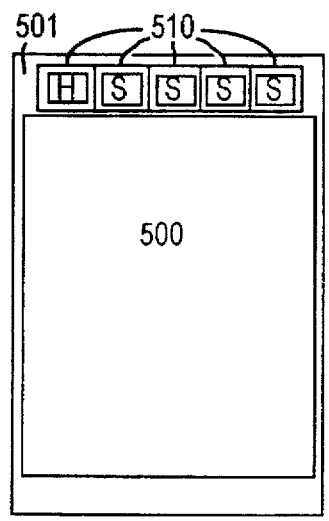
FIGS. 4A–4E and 4G depict various exemplary methods of battery identification.
Figure 4B:
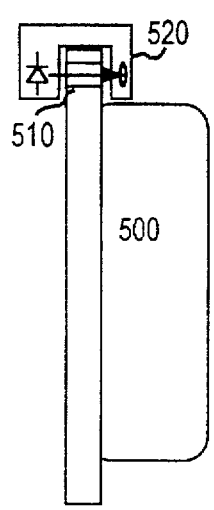
Figure 4C:
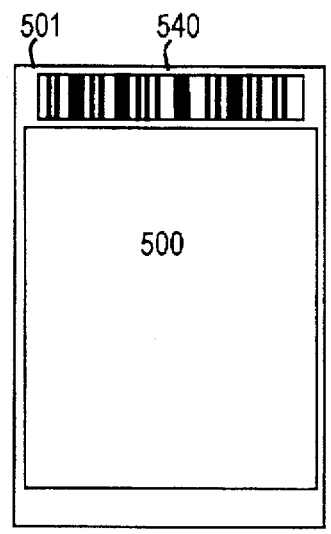
Figure 4D:
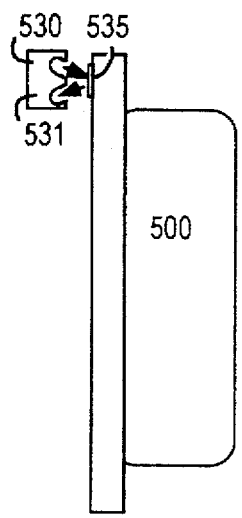
Figure 4E:
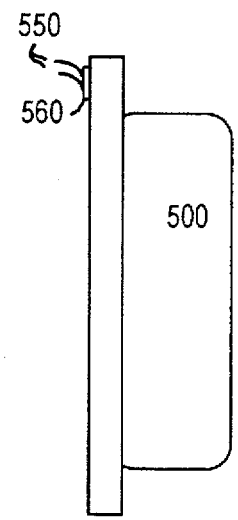
Figure 4G:
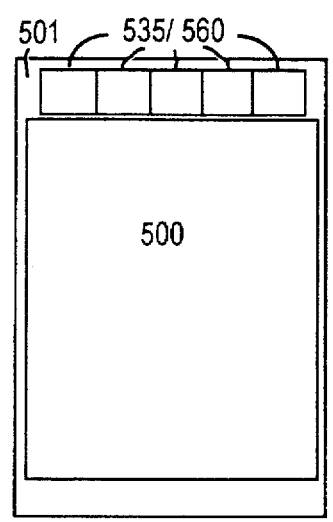

Battery identification is required to enable the charger to determine the battery chemistry employed i.e. NICAD, Nickel hydride, Lead acid, etc. and may provide identification of a battery within a battery type. Various methods of identification are known, for example, batteries are available equipped with a microprocessor, memory and data communication capability. These are referred to as smart batteries. However, in a consumer product environment, a preferred technique should represent a minimum cost solution, with additional parts, and thus costs, included in the charging device rather than the battery. Since there are so many more batteries than battery chargers smart battery chargers are more cost effective than smart batteries. A non-contact sensing method is also preferred in consideration of reliability with user multiple operations. In addition non-contact sensing may be less exacting of mechanical alignment between the battery and charger. Various exemplary non-contact battery identification methods are illustrated in FIGS. 4A, 4B, 4C and 4D, which depict the sensing of passive indicia. FIG. 4A illustrates the utilization of push out holes H, S, S, S, located in the periphery 501 of battery 500. The periphery 501 of battery 500 may be positioned within an opto coupler 520 illumination path, as depicted in FIG. 4B. Hence the opto illumination may be coupled to the opto receiver via hole H, 510, or blocked by solid S. The use of four push out holes, may for example, permit 15 different battery identifying codes to be detected, where an 16th combination i.e. no holes is reserved for new, originally supplied batteries. A further non-contact sensing method for battery identification is depicted in FIG. 4C which employs a bar coded pattern 540 adhered to the battery housing. The bar coded pattern may, for example, vary in transparency or reflectance thus permitting reading by the methods shown in FIG. 4B or 4D. A bar code indicia may provide ten or more characters which may identify both battery type and identifying number or letter combination. FIG. 4D illustrates a further non-contact sensing method where a series of reflective patches 540, for example, reflective tape adhered to the battery case or periphery 501. Reflective patches 535 reflect illumination, generated by opto transmitter 530, back into photo sensor 531. A further exemplary technique is shown in FIG. 4E which employs mechanical sensing contacts 550 which touch battery mounted conductive pads 560. FIG. 4G illustrates an exemplary positioning of passive reflective or conductive indicia. In a camcorder application the battery supplied with device may be unmarked, and when sensed may cause the generation of a specific unique identification. Batteries supplied as spare parts or replacements, may be produced with a standardized mounting and mechanical foot print. Thus, by the use of coding as described, a smart charger may determine the correct charging parameters for a specific type of battery and the user may number or identify multiple batteries.

FIG. 5 illustrates in flow chart form, parts of the inventive method which allows the user to construct personalized calendars. The user may enter specific event dates which are advantageously combined with the custom calendar to generate a consolidated or composite calendar. The consolidated calendar is compared with a real time clock (RTC) and upon coincidence, an "on time" or event occurrence signal is generated. The occurrence of consolidated calendar events may be advantageously anticipated by the inventive method. The anticipation or look ahead period is predetermined and may be provided by calculation which generates a modified or early real time clock, or by a similar calculation which generates an early version of the consolidated calendar. FIG. 5 illustrates event anticipation by generation of a modified, or early real time clock. Upon coincidence with the early real time clock (ERTC), the anticipated event is tested to determine if the battery, coupled for charging, is already charged. If the battery is not charged, charging is initiated in anticipation of the yet to occur event.

In the FIG. 5 flow chart the user starts at step 800 and may make various selections and enter specific event dates. At step 805 selections may be made from a first calendar of named events preprogrammed and stored in non-volatile memory. Similarly at step 810 the user may select events from a second preprogrammed events calendar. Further preprogrammed events calendars, not illustrated for simplicity, may be provided for user selection. These user selected calendars and parts thereof are combined in date order at step 815 and generate at step 820 the user's custom calendar.

At step 825 the user may input specific calendar dated named events which are merged, or combined, with the custom calendar at step 830. The result of step 830 is the generation at step 835 of a consolidated calendar. Thus the consolidated calendar represents the amalgamation of the various user selections from the pre-programmed calendars with the users own specific events.

The consolidated calendar of step 835 is tested at step 845 for equality to, or coincidence with, a real time clock (RTC) from step 840. If test 845 is NO the consolidated calendar event has not occurred and the test condition is looped back to test coincidence at the next increment of the RTC 840. The real time clock may be selected to increment the output time at various intervals, for example, 5 minutes, 15 minutes, one hour or daily. In the interest of flow chart simplicity only one test 845 is illustrated, however, a plurality of tests may be utilized coupled to variously incremented RTC outputs. When there is coincidence between the consolidated calendar and RTC, YES is generated at 845, thus indicating an "on time" event occurrence.

Event anticipation or "look ahead" is advantageously provided by step 850 which generates an early real time clock ERTC. The period of the anticipation is preset, for example, for automated battery charging a period of 7 days may be suitable. The consolidated calendar is tested at step 855 for coincidence with the ERTC from step 850. If test 855 is NO, the anticipated event has not occurred and the test condition is looped back to test coincidence at the next increment of ERTC 850. If test 855 is YES, the anticipated event has occurred causing the battery to be tested for a charged condition at step 865. If the battery is charged, step 865 tests YES and the test condition is looped back to wait for the next anticipated consolidated calendar event at step 855. Thus a YES at step 865 adapts or inhibits calendar generated initiation to avoid unnecessary battery charging.

If step 865 tests NO the battery is not charged and a control signal is generated at step 870. The control signal may be utilized to initiate battery charging. Following generation of the control signal a test is performed at step 875 which tests for a charged battery condition and for the occurrence of a charger or battery malfunction. If step 875 tests NO, the test is looped back to the input of step 875. However if step 875 tests YES, data is stored, for example, data relating to battery type and identification, charge status of battery and status of the charger. In addition to data relating to battery and charger status a cumulative total of charges and rejuvenations is also stored and updated. Thus a history is established for each battery charged. The battery charging history may be viewed on the charger display, TV screen or may be accessed via the data port by an external personal computer. Hence, the user or service technician may obtain battery life records.

A further adaptation to the calendar generated charging is provided by a timer function invoked at step 860. When test 855 is YES, a timer at step 860 is started which has a period, for example, of 4 weeks duration. Upon expiration of the exemplary 4 week period, the timer generates an input to test step 865. Thus, during periods without anticipated event activity the timer provides charge initiation, via steps 865 and 870, correcting self discharge effects in the battery. An anticipated event occurrence, YES at step 855, causes the timer to be reset restarting the timing period.

The inventive method provides the user with the ability to generate a custom calendar which may be advantageously combined with user relevant dates. The control method advantageously anticipates calendar events and initiates battery charging. However, unplanned, spontaneous, device usage, resulting in battery discharge may be accommodated by the algorithm which may modify, or ignore calendar generated initiation based on actual battery condition.

What is claimed is:

1. A battery charging apparatus comprising:
    a power supply for generating a battery charging current;
    means for coupling said charging current to a battery responsive to a control signal;
    a memory for storing a calendar, a calendar dated event, and a control algorithm; and
    a microprocessor for executing said algorithm and generating said control signal a predetermined time in advance of an occurrence of said calendar dated event.

2. The battery charging apparatus of claim 1, wherein said battery charging current has opposite polarities for charging and discharging said battery responsive to said control signal.

3. A battery charging apparatus comprising:
    a battery charging current source;
    a controllable coupling, responsive to a first control signal, for coupling said charging current to a battery;
    a memory for storing a calendar, calendar dated events, and a control algorithm; and
    a microprocessor for executing said algorithm, said microprocessor generating said first control signal at a predetermined time in advance of any one of said calendar dated events, and generating a second control signal on an occurrence of any one of said calendar dated events.

4. The battery charging apparatus of claim 1, wherein said microprocessor includes a clock generator for generating a real time clock calendar.

5. The battery charging apparatus of claim 4, wherein said microprocessor generates said control signal upon coincidence of a real time clock calendar and said calendar dated event.

6. The battery charging apparatus of claim 1, wherein said control signal generation is responsive to a status of a battery to be charged.

7. The battery charging apparatus of claim 6, wherein said control signal generation is inhibited upon said battery status being indicative of a charged battery condition.

8. The battery charging apparatus of claim 3, wherein said microprocessor generates a message waiting indication upon occurrence of said calendar dated event.

9. The battery charging apparatus of claim 3, wherein said microprocessor generates a display message signal upon occurrence of said calendar dated event.

10. The battery charging apparatus of claim 9, wherein said display message is generated from a plurality of messages stored in a memory.

11. The battery charging apparatus of claim 9, wherein said display message signal is a video display signal.

12. The battery charging apparatus of claim 11, wherein said video display signal is coupled to an RF modulator for generating a signal for viewing on a TV receiver.

13. The battery charging apparatus of claim 3, wherein said algorithm records, in said memory, information relating to a status of said charging apparatus upon completion of battery charging.

14. The battery charging apparatus of claim 1, wherein said algorithm records in said memory information relating to said battery upon completion of charging said battery.

15. The battery charging apparatus of claim 14, wherein said information comprises a code identifying said battery.

16. The battery charging apparatus of claim 15, wherein said identifying code indicates said battery type.

17. The battery charging apparatus of claim 15, wherein said identifying code indicates a number of said battery.

18. The battery charging apparatus of claim 14, wherein said information comprises charging data for said battery.

19. The battery charging apparatus of claim 18, wherein said charging data comprises a cumulative total of charging operations.

20. The battery charging apparatus of claim 18, wherein said charging data comprises a cumulative total of rejuvenation operations.

21. The battery charging apparatus of claim 3, wherein said calendar dated event is generated responsive to an algorithm which combines a selected event from a preprogrammed event calendar with user derived event dates.

22. A battery for powering portable equipment, comprising:

a battery housing having at least one energizing cell; and, indicia disposed on said housing for non-contact sensing by an external sensing means, said indicia representing data enabling automatic selection of battery charging parameters.

23. The battery of claim 22, wherein said indicia additionally comprises data which precludes charging a non-rechargeable cell.

24. A battery charging apparatus comprising:

a power supply for generating a charging current for at least one battery type responsive to a control signal;

a non-contact means for sensing an indicia disposed on a surface of a battery coupled for charging and generating therefrom data indicating said battery type; and, a microprocessor coupled to said sensing means and generating said control signal responsive to said data generated by said sensing means.

* * * * *